United States Patent
Radigan et al.

(10) Patent No.: US 10,861,493 B1
(45) Date of Patent: Dec. 8, 2020

(54) MAGNETO-OPTIC SYSTEMS WITH MULTI-ID DISK POSITIONING

(71) Applicant: KLA Corporation, Milpitas, CA (US)

(72) Inventors: Thomas J. Radigan, Atkinson, NH (US); Ferenc Z. Vajda, Winchester, MA (US)

(73) Assignee: KLA Corporation, Milpitas, CA (US)

( * ) Notice: Subject to any disclaimer, the term of this patent is extended or adjusted under 35 U.S.C. 154(b) by 158 days.

(21) Appl. No.: 14/756,069

(22) Filed: Jul. 28, 2015

Related U.S. Application Data (60) Provisional application No. 61/999,505, filed on Jul. 29, 2014.

(51) Int. Cl.
*G11B 19/04* (2006.01)
*B65G 47/91* (2006.01)

(52) U.S. Cl.
CPC ............ *G11B 19/048* (2013.01); *B65G 47/91* (2013.01)

(58) Field of Classification Search
CPC ...... G01R 33/26; G01R 33/24; A61B 5/0515; A61B 5/05; A61B 5/055
USPC ........................................................ 324/301
See application file for complete search history.

(56) References Cited

U.S. PATENT DOCUMENTS

| | | | | |
|---|---|---|---|---|
| 3,725,775 A * | 4/1973 | Gasser | .................. | G01R 33/26 324/301 |
| 4,502,133 A * | 2/1985 | Siryj | .................. | G11B 17/225 369/30.32 |
| 4,993,012 A * | 2/1991 | Fuji | .................. | G11B 11/10597 360/74.5 |
| 5,101,385 A * | 3/1992 | Farnsworth | .......... | G11B 7/0031 360/59 |
| 5,132,944 A * | 7/1992 | Berg | .................. | G11B 7/08576 369/13.34 |
| 5,216,643 A * | 6/1993 | Berg | ................. | G11B 11/10504 360/59 |
| 5,218,488 A * | 6/1993 | Berg | ................. | G11B 11/10504 360/59 |
| 5,528,566 A * | 6/1996 | McGee | .................. | G11B 17/24 221/278 |
| 5,572,383 A * | 11/1996 | Hoshi | .................... | G11B 5/012 360/98.07 |

(Continued)

*Primary Examiner* — Christopher P McAndrew
(74) *Attorney, Agent, or Firm* — Suiter Swantz pc llo (57) ABSTRACT

An automatic magneto-optic system includes a high field magnet controlled by a magnet control module, a non-contact magneto-optic measurement module, and an automated cassette-based disk transfer module. The magnet control module is constructed and arranged to apply a magnetic field of constant or a time-varying strength to a selected location of a magnetic disk. The non-contact magneto-optic measurement module includes a light source module and a measurement module. The automated cassette-based disk transfer module is constructed and arranged to position a selected location of a magnetic disc inside the magnet. The disk transfer module may include a multi-disk positioning module. The multi-disk positioning module may include one, two or more motors. The multi-disk positioning module may be constructed to determine angular displacement or rotation necessary for a second selected location to be inside the magnet to perform the magneto-optic measurement and constructed to attain the second selected position.

23 Claims, 9 Drawing Sheets

(56) References Cited

U.S. PATENT DOCUMENTS

| | | | | |
|---|---|---|---|---|
| 5,657,617 A | * | 8/1997 | Allen | B65B 7/2842 53/284 |
| 2009/0237842 A1 | * | 9/2009 | Ehrlich | G11B 5/012 360/240 |
| 2009/0244775 A1 | * | 10/2009 | Ehrlich | G11B 20/1217 360/135 |

* cited by examiner

MAGNETO-OPTIC SYSTEMS WITH MULTI-ID DISK POSITIONING

This application claims priority from U.S. Provisional Application 61/999,505, filed Jul. 29, 2014, entitled Magneto-Optic Systems with Multi-ID Disk Positioning, which application is incorporated by reference.

FIELD OF THE INVENTION

The present inventions are directed to automatic magneto-optic systems with multi-disk size positioning.

BACKGROUND OF THE INVENTION

During and after the manufacturing process of magnetic storage media manufacturers need to test the products to ensure that they meet certain standards of quality. The magneto-optic effect is a phenomenon used for the non-contact testing of the storage media located inside the magnetic field.

The magneto-optic Faraday effect may be used for characterization of magnetic materials located in the magnetic field, where light transmission through the magnetic material is possible. On the other hand, the magneto-optic Kerr effect may be used for characterization of magnetic materials located in the magnetic field, where the light source and detector are arranged in the reflection geometry relative to the material surface.

In the magneto-optic Kerr effect, the reflected beam will undergo a polarization rotation change or the change of intensity that depends on the magnetic properties of the material surface. The amount of change in the polarization state (or the light intensity) is proportional to the magnetization in the material. The light source and detector geometry, with respect to the magnetic field applied, may be designed to perform a longitudinal Kerr measurement, a transverse Kerr measurement, or a polar Kerr measurement. In the longitudinal geometry, the magnetic field is applied parallel to the plane of the deposited media and the plane of incidence of the light. In the transverse geometry, the magnetic field is applied perpendicular to the plane of incidence of the light. In the polar geometry, the magnetic field is applied orthogonal to the surface of the sample. In all cases, a polarization rotation in the detected light provides an indication of the relative magnetization of the deposited material.

There is still a need for an improved system that can perform the above-described measurements automatically using multi-disk size positioning module.

SUMMARY OF THE INVENTION

The present inventions are directed to automatic magneto-optic systems with multi-disk size positioning module. However, in general, the present invention is not limited to measuring or characterizing magnetic disks and can be applied to any magnetic medium.

An automatic magneto-optic system includes a high field magnet controlled by a magnet control module, a non-contact magneto-optic measurement module, and an automated cassette-based disk transfer module. The magnet control module is constructed and arranged to apply a magnetic field of constant or a time-varying strength to a selected location of a magnetic disk. The non-contact magneto-optic measurement module includes a light source module configured to direct a polarized optical beam towards the selected location of the magnetic disk, which is in the magnetic field, wherein the optical beam is modified at the point of incidence. The non-contact magneto-optic measurement module also includes a light detection module configured to obtain a series of optical signal measurements of the reflected optical beam or the refracted optical beam.

According to one aspect, the automated cassette-based disk transfer module is constructed and arranged to position a selected location of a magnetic disc inside the magnet. The disk transfer module may include a multi-disk positioning module. The multi-disk positioning module may include one, two or more motors. The motors may include a transfer motor, a direct drive rotary motor, a step motor or other. The multi-disk positioning module may be constructed to determine angular displacement or rotation necessary for a second selected location to be inside the magnet to perform the magneto-optic measurement and constructed to attain the second selected position. The disk transfer module may include transfer blades with vacuum saddles constructed to accommodate disks of two, three or more sizes. The multi-disk positioning module may be constructed to receive and hold disks of two, three or more sizes. The multi-disk positioning module may include a vacuum holder that is constructed to receive and hold disks of two, three or more sizes. The vacuum holder may be constructed to angularly displace or rotate the disks of two, three or more sizes. The vacuum holder may include two, three or more vacuum rings for holding the disks. The vacuum holder may include a size adjustable vacuum ring for holding the disks.

According to another aspect, the automated cassette-based disk transfer module includes a multi-disk positioning module designed and constructed to be positioned inside the magnet. The multi-disk positioning module may include one, two or more motors. The motors may include a transfer motor, a direct drive rotary motor, a step motor or other. The multi-disk positioning module may be constructed to determine angular displacement or rotation necessary for a second selected location to be examined by the magneto-optic measurement. The multi-disk positioning module may be constructed to determine angular displacement or rotation necessary for a third selected location to be examined by the magneto-optic measurement. The multi-disk positioning module may be constructed to determine angular displacement or rotation necessary for a number of selected locations to be examined by the magneto-optic measurement. The locations may be programmed for automated execution of the magneto-optic measurement or measurements. These locations may be varied continuously or discontinuously while performing the magneto-optic measurements. The multi-disk positioning module may include a vacuum holder constructed to receive and hold disks of two, three or more sizes. The vacuum holder may be constructed to angularly displace or rotate the disks of two, three or more sizes. The vacuum holder may include two, three or more vacuum rings for holding the disks.

The entire operation, including the selection of the locations and the magneto-optic measurements, is controlled automatically by a high-level control software executed, for example, by the control and data acquisition module. A separate data processing hardware module may be included.

Additional aspects are shown in the following drawings and described below.

BRIEF DESCRIPTION OF THE DRAWINGS

FIGS. 4C-I and 4C-II are illustrative cross-sectional views of the disk holder used in the multi-disk positioning module.

DETAILED DESCRIPTION OF ILLUSTRATED EMBODIMENTS

Figure 1:
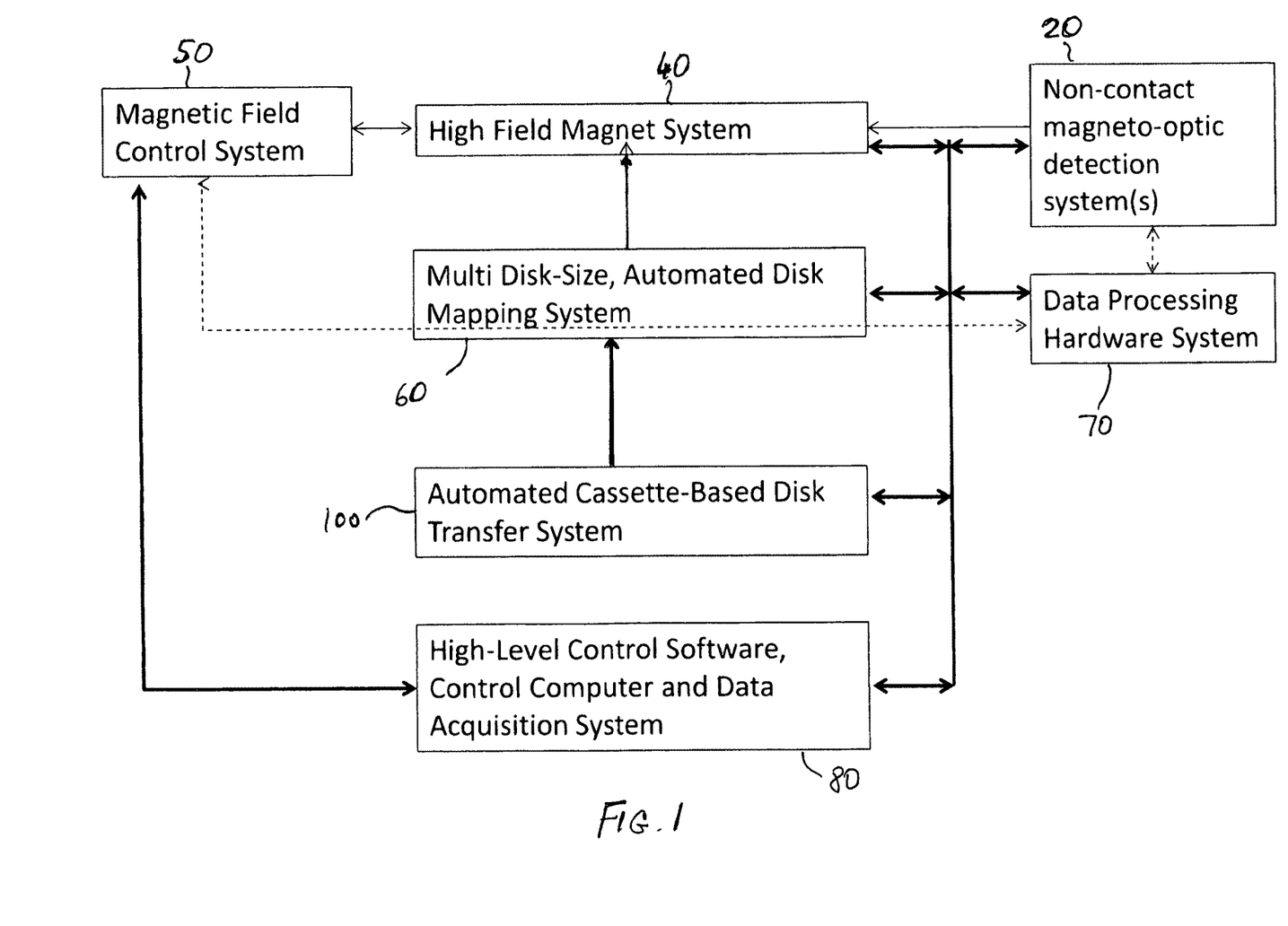
FIG. 1 illustrates diagrammatically an automatic magneto-optic system with multi-disk size positioning.

FIG. 1 illustrates diagrammatically an automatic magneto-optic system 10. Magneto-optic system 10 includes a non-contact optical measurement module 20 for measuring a sample located inside a high field magnet module 40 controlled by a magnetic field control system 50. Magneto-optic system 10 also includes an automated cassette-based disk transfer module 100 presenting automatically a selected disk to an automated multi-disk size mapping system 60. Automated multi-disk size mapping system 60 ensures that selected locations on the examined disk are optically measured when the disk is delivered and positioned inside the high field magnet. The entire operation is controlled by a control computer and data acquisition module 80. Magneto-optic system 10 also includes a data processing hardware module 70, interacting with above-mentioned modules 60 and 100, and interacting with magnetic field control system 50, which controls the magnetic field inside high field magnet module 40.

Non-contact optical measurement module 20 includes a light source module and a light detection module both designed to perform the optical measurements of a sample located inside the magnetic field. The optical measurements are either for measuring the Faraday effect or the Kerr effect, automatically selected by the control software.

The light source module includes an optical beam generation unit comprising an optical beam system, one or more optical mirrors and a polarizer. The optical beam unit generates an incident optical beam directed by the optical mirrors through the polarizer onto a surface of the measured magnetic material. The polarizer polarizes the light beam in a certain plane relative to the incident optical beam before this beam reaches the measured surface. During the magneto-optical Kerr measurement, the incident polarized beam is reflected of the magnetic material at a point of incidence. During the magneto-optical Faraday measurement, the incident polarized beam is refracted and travels through the magnetic material and is detected by a detector included in the light detection module.

The light detection module includes one or more mirrors, an analyzer, a photo detector, and an amplifier for amplifying the signal corresponding to the detected light. The analyzer may include a polarizer with a high extinction ratio. The photo detector converts the intensity of the signal received from the analyzer into an analog electrical signal amplified and digitized and provided to data processing hardware module 70. The physical geometries of the light source and detection module depend on the magnet design and the type of measurement. In one embodiment, the physical geometries can be selected by the control software.

According to a preferred embodiment, automatic magneto-optic system 10 is designed to perform the magneto-optical Kerr measurements. The Kerr effect rotates the polarization plane of the reflected optical beam relative to the polarization plane of the incident optical beam depending on the magnetization of the measured sample located inside the magnet. The rotation angle of polarization impacts how the reflected optical beam travels through the analyzer. The optical axis of the analyzer relative to the optical axis of the polarizer is properly selected for the measurement to have a desired range.

The magnetic field control module includes a magnetic field driver providing current to a magnetic coil associated with the high field magnet. The magnetic field control module governs the orientation and strength of the magnetic field to be applied for testing the surface of the magnetic sample. Of course, magnetic field is applied through the magnetic poles and the applied magnetic filed is measured and reported by the field meter. The magnetic poles may be oriented longitudinally or perpendicularly to the magnetic sample so that the gap is properly aligned.

The entire operation of automatic magneto-optic system 10 is controlled by a high-level software that allows a user to create test routines for automatically loading and positioning one or more disks sequentially. A user selects one or several disk measurement recipes including testing locations and parameters for the tests that are automatically executed on magnetic disks of multiple sizes. The disks may be stored in a disk cassette. The user can define the magnetic field to be scanned in the range of ±2 Tesla up to ±9 Tesla for one measurement location, or a fixed field for several locations on the measured disk. The software controls a disk positioning module that brings the measured disk to the correct magnet location. After positioning, the programmed magnetic field is scanned, while the change in the polarization of the reflected beam is continuously measured at that location.

For example, the system can quickly determine the uniformity of the perpendicular recording layer of a Heat Assisted Magnetic Recording disk (also called Thermally Assisted Recording disks), immediately after deposition. The measurement provides a non-destructive, non-contact double-sided mapping of the magnetic properties. The system can automatically generate a map of the magnetic properties of the disk, and can simultaneously measure the ultra-high field hysteresis loop on both sides of the disk. To evaluate the magnetic layer, the system can provide values of the coercivity, nucleation field, interaction field, squareness ($H_c$, $H_{ex}$, $H_n$, S) and other parameters. The system enables dynamic mapping of the parameters.

Other embodiments of the magneto-optic system are described in U.S. Pat. Nos. 6,501,269, 7,166,997, or U.S. Pat. No. 8,264,693, all of which are incorporated by reference as if fully reproduced herein.

Figure 2:
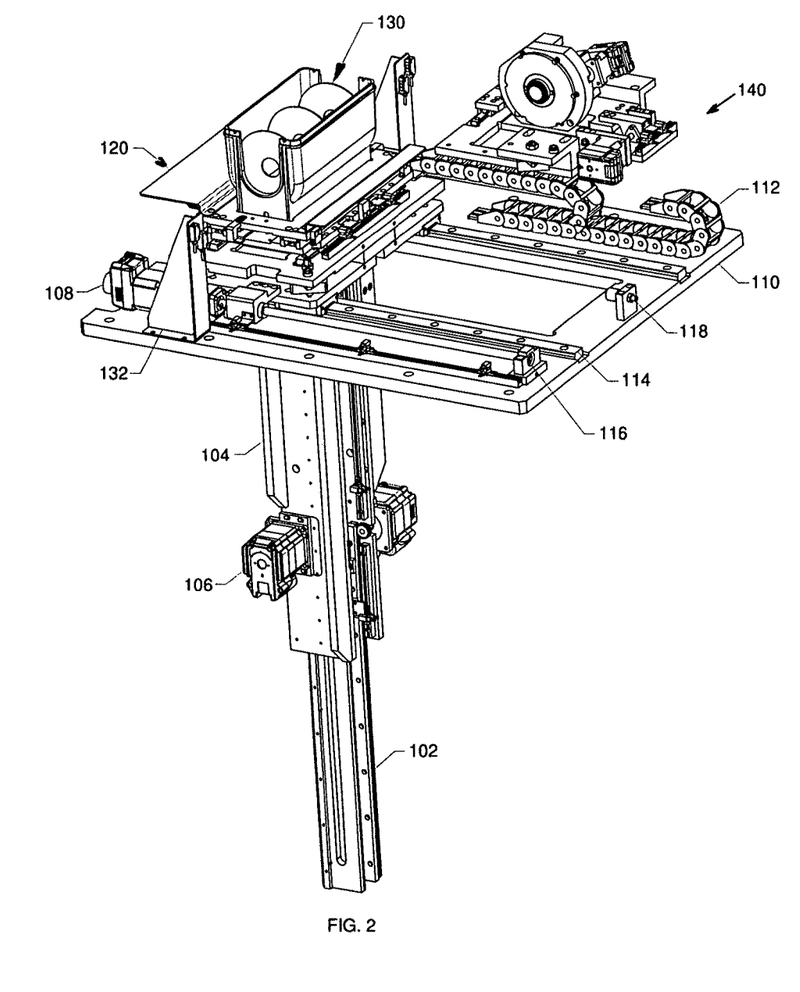
FIG. 2 is a perspective view of an automatic cassette-based disk transfer module.
Figure 2A:
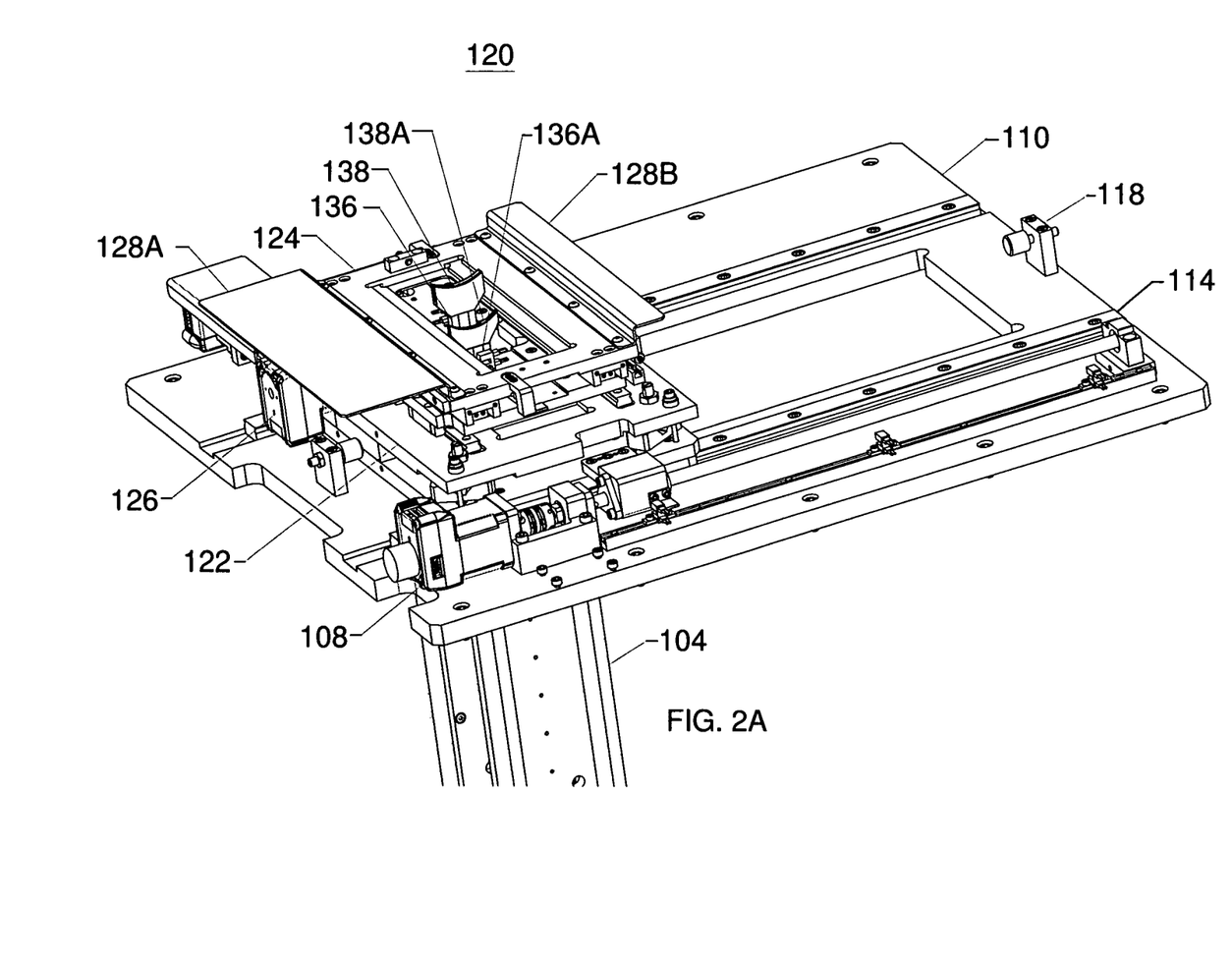
FIG. 2A is an enlarged perspective view of the module shown in FIG. 2.

FIG. 2 is a perspective view of an automatic cassette-based disk transfer module 100 designed for handling automatically disks of different sizes (multi-ID disks). FIG. 2A is a more detailed perspective view of an automatic cassette-based disk transfer module with the cassette removed. Disk module 100 includes a mounting plate 110 accommodating a lifter blade selector 120, a disk cassette assembly 130, and a multi-disk assembly 140 mounted on a cable track 112. Disk cassette assembly 130 moves with respect to plate 110 using a cassette slide 114 and a transfer mechanism 116, wherein the cassette assembly, mounted on a stage 122, is displaced by a motor 108. A cassette transport hard stop 118 provides a stop at the maximum cassette extension. A cassette moving motor 126 is used for displacement.

FIG. 2A depicts the cassette-based disk transfer module with the cassette removed, showing only a stage 124, so that the multi-ID disk transfer mechanism can be explained. This disk transfer mechanism includes lifter blade selector 120, a blade transfer stage 102, a blade stationary plate 104, and two or more blade transfer motors 106. Lifter blade selector 120 is an automated, software-driven system that selects the lifter blade based on the cassette size. Blade transfer motor 106 is designed and arranged to displace one lifter blade 136, which includes at its distal end a saddle 138. Each saddle 138 is constructed and designed to fit to a disk curvature of a selected size. The coupling between saddle 138 and the disk is achieved by application of vacuum. FIG. 2A illustrates two lifter blades 136 and 136A having at their distal ends saddles 138 and 138A, respectively. Each lifter blade, displaced by blade transfer motor 106, delivers one disk of a selected size to and from multi-disk assembly 140.

Figure 3:
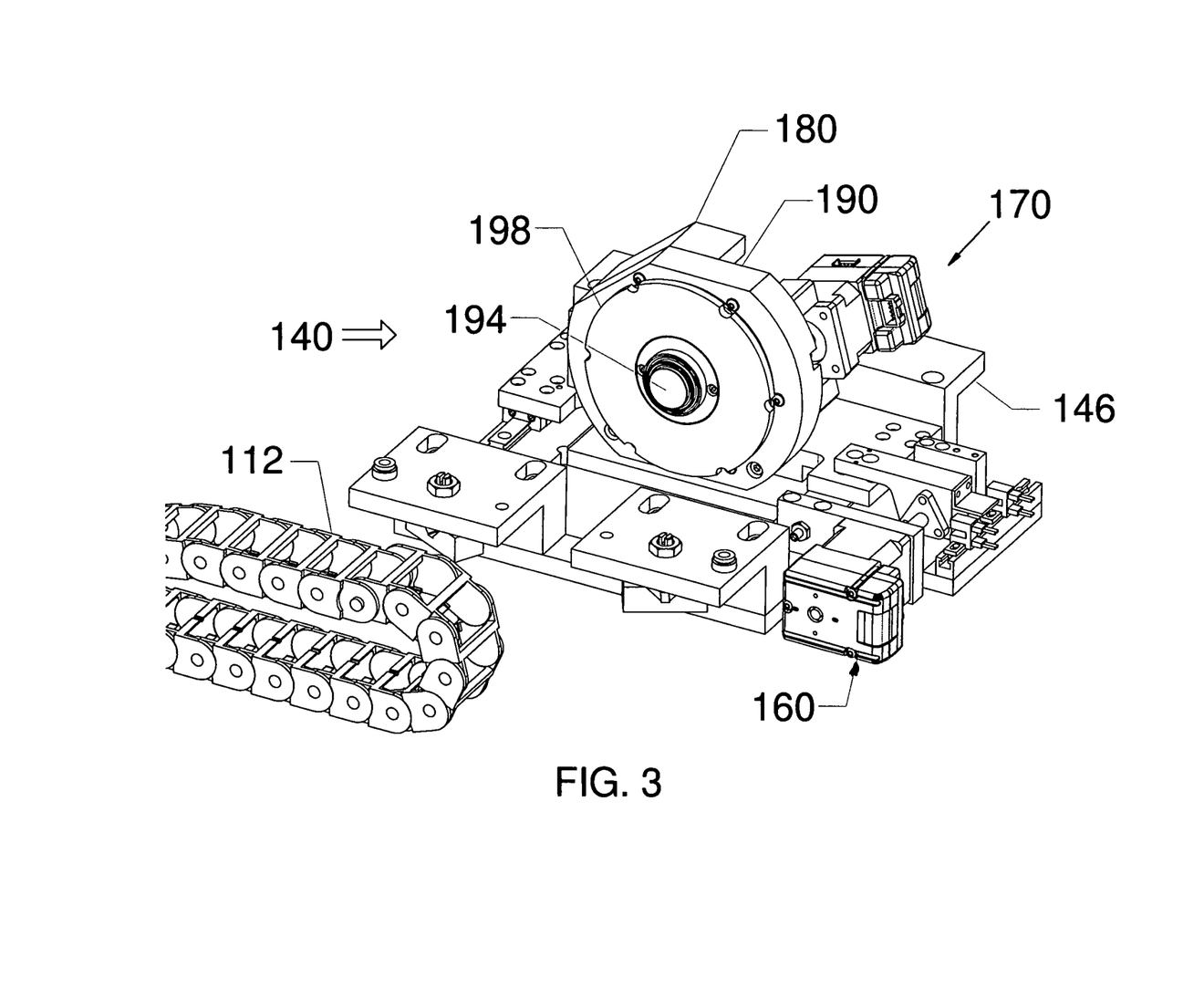
FIGS. 3 and 3A are perspective views of a multi-disk positioning module.
Figure 3A:
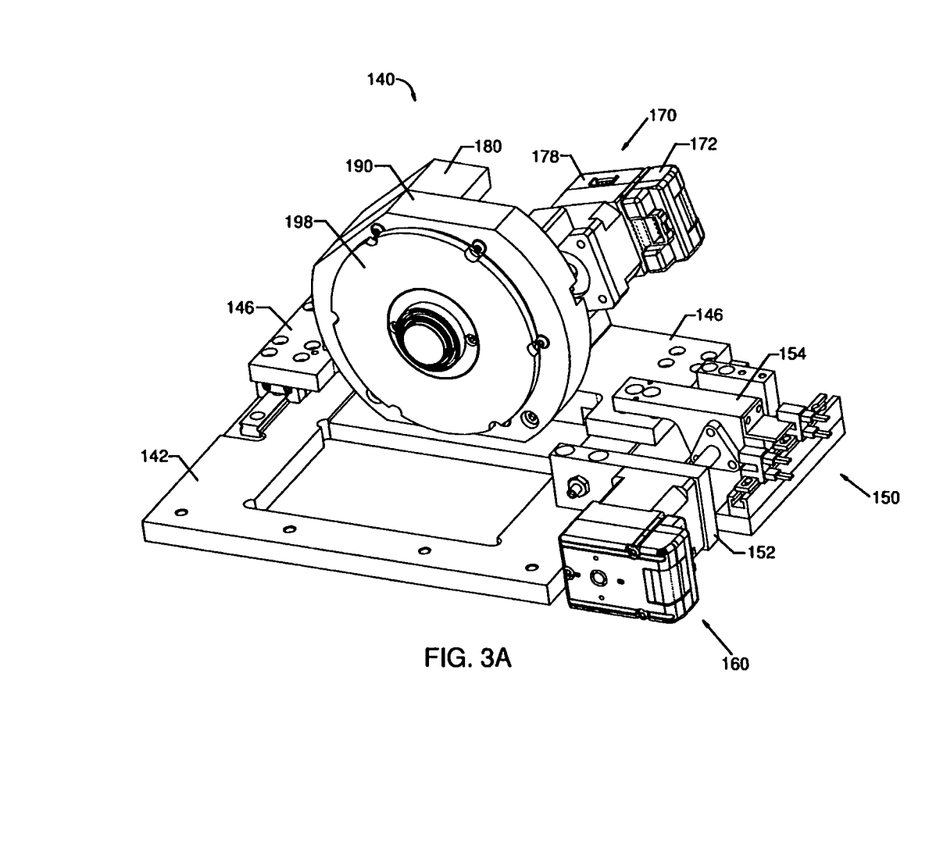

FIGS. 3 and 3A are perspective views of multi-disk size (multi-ID) assembly 140. Multi-disk assembly 140 is an automated angular displacement assembly for positioning a disk of a selected size at a selected angular displacement, or for rotating this disk, prior to or during a magneto-optic measurement. Multi-disk assembly 140 is mounted on a mounting plate 142, which is attached to a rotary disk mounting plate 146. The multi-ID disks are mounted on and held by a multi-ID integrated vacuum assembly 194. In FIGS. 3 and 3A, assembly 140 is mounted on plate 142 positioned horizontally, but the assembly construction allows vertical mounting, or mounting at any angle, which may be suitable for optimal geometry or easier handling or transfer of the examined disk.

Assembly 140 uses two motors; that is, a transfer motor 160 and a direct driver rotary motor 170. Also referring to FIG. 4, transfer motor 160 is coupled to an integrated lead screw mechanism 152 and a lead screw interface moving plate 154. The limit and home switches 150 define the excursions for this mechanical system. Transfer motor 160 drives an automated mechanism to transfer a disk between the lifter blade and appropriate portion of the angular or rotary stage. Direct driver rotary motor 170 provides angular displacement of the disk according to an algorithm to achieve mapping without 2-d translation.

Figure 4:
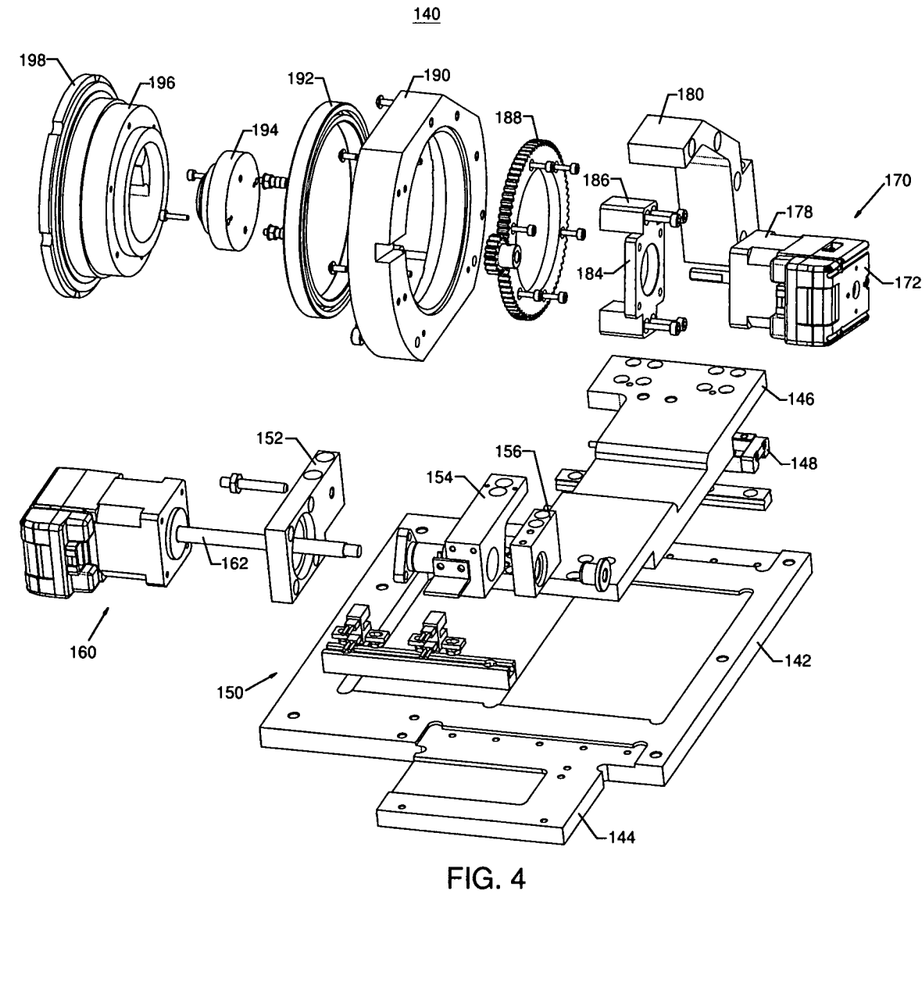
FIG. 4 is an exploded perspective view of the multi-disk positioning module.
Figure 4A:
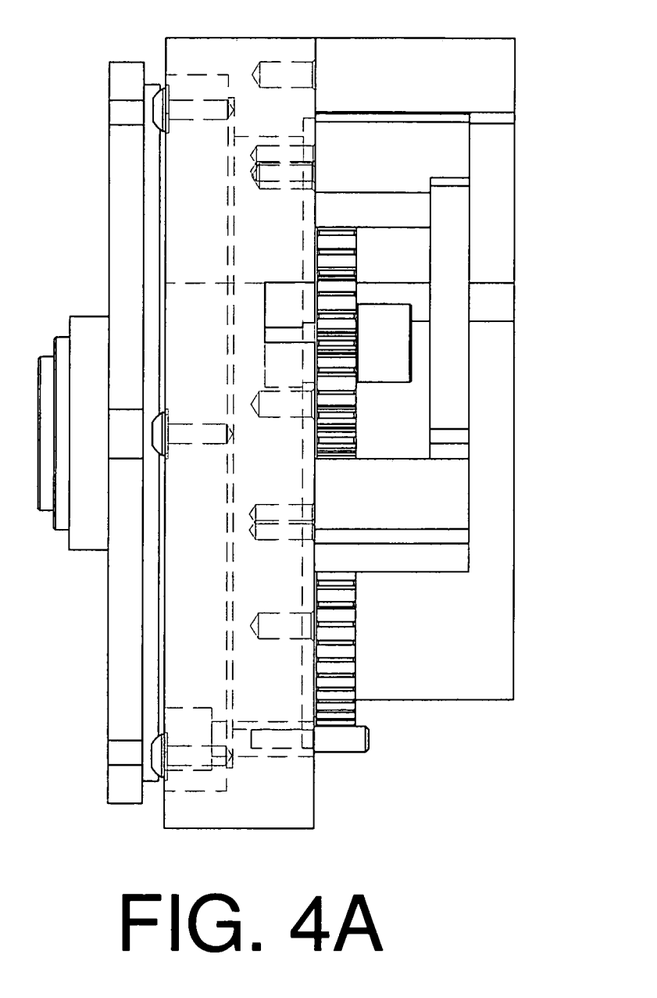
FIG. 4A is a side view of a drive and gear assembly also shown in FIG. 4.

Referring to FIGS. 4 and 4A, direct drive rotary motor 170 is mounted on a rotary sub-plate 146 and drives a rotary drive mechanism, which includes a bearing interface plate 186, a rotary drive mechanism 188, and a rotary interface stationary plate 190. Rotary drive mechanism 188 allows automatic, continuous rotation or an angular displacement of the disk mounted on a vacuum holder 194. This mechanism also includes a universal plate 192 for multi-ID integrated vacuum holder 194 and a bearing plate 198. When the disk is held in position by vacuum holder 194, bearing plate 198 is displaced using transfer motor 160 so that the disk placed at a selected location and orientation can be automatically transferred or positioned into the measurement position. FIG. 4A is a cross-sectional view of the drive and gear assembly also shown in FIG. 4.

Figure 4B:
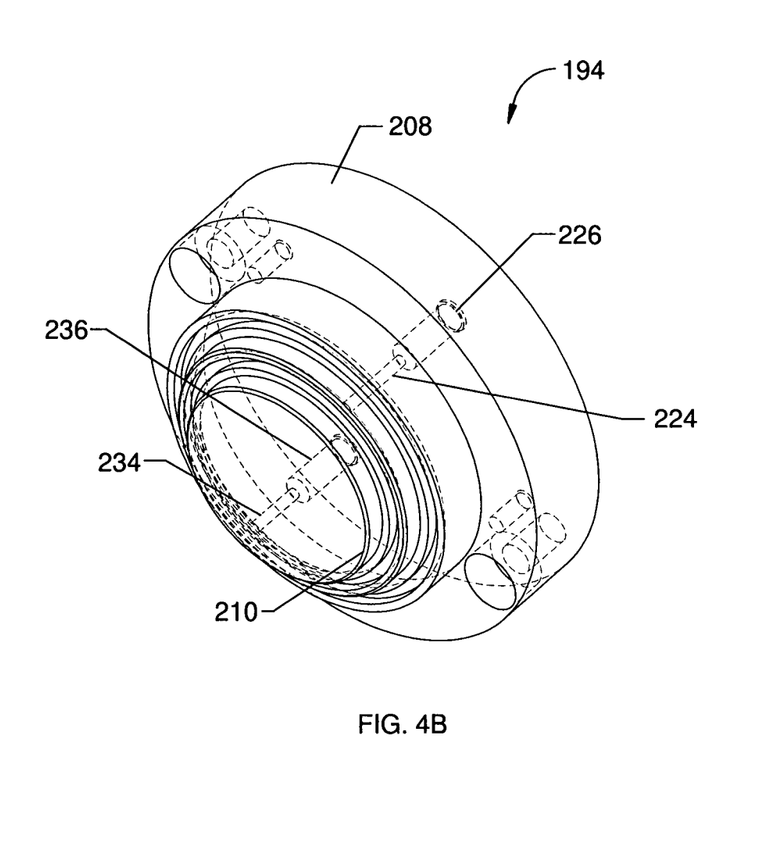
FIG. 4B is a perspective view of a disk holder used in the multi-disk positioning module of FIG. 4.
Figures 2, 4C:
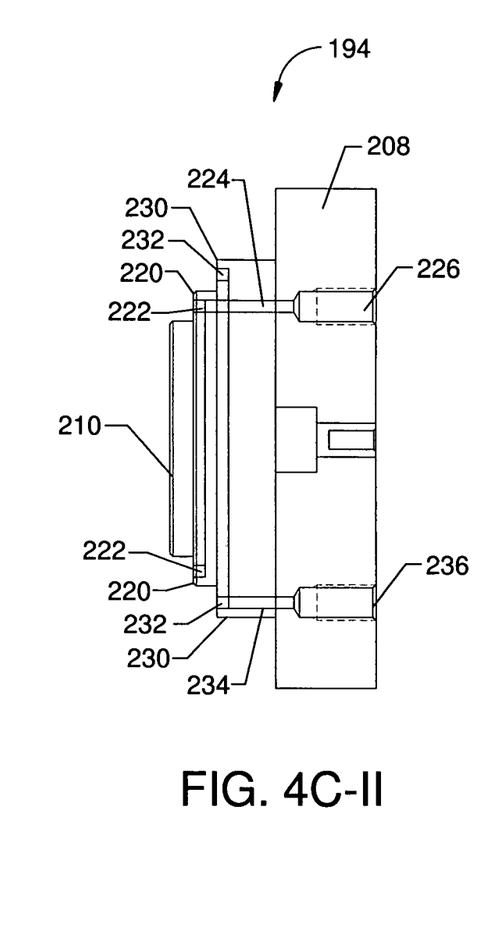
Figures 1, 4C:
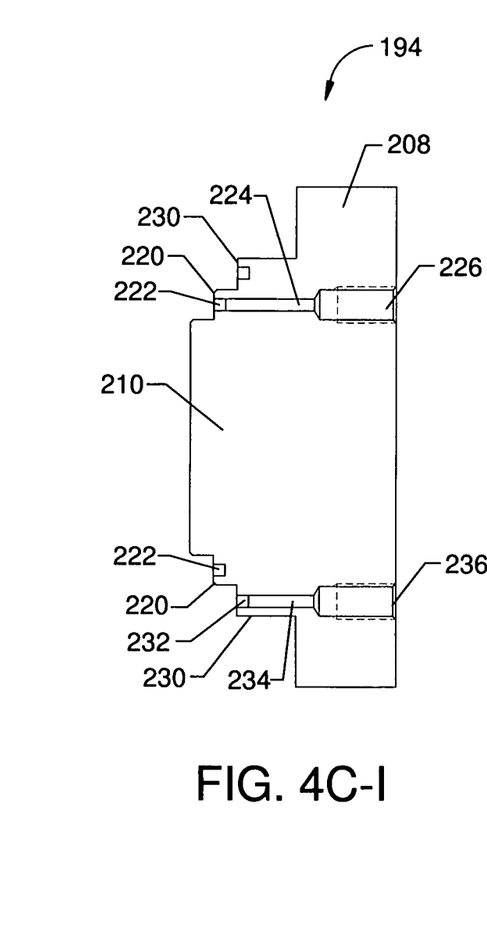

FIG. 4B is a perspective view of a disk holder used in the multi-disk positioning module. FIGS. 4C-I and 4C-II are illustrative cross-sectional views of the disk holder explaining how disks of different sizes are held in position. In general, multi-ID integrated vacuum holder 194 is constructed to include two or more support surfaces, and two or more vacuum channels with independent vacuum feeds to hold disks of two or more sizes without any reconfiguration. This creates a unique grip and release mechanism that is vacuum actuated and operates with the described lifter blades and the associated saddles. However, this grip and release mechanism for multi-ID disks may be implemented by other pneumatic means, or by hydraulic means in combination with mechanical means.

According to a preferred embodiment, multi-ID integrated vacuum holder 194, shown in FIGS. 4B, 4C-I and 4C-II, is machined from a single block 208 or assembled from several pieces and includes two vacuum channels in the form of two vacuum rings. Vacuum holder 194 includes a planar surface 210 and separate disk support surfaces 220 and 230, each for supporting a disk of a selected size. Disk support surface 220 is cooperatively designed with a vacuum ring 222 coupled to a vacuum conduit 224 and a vacuum coupling 226. Disk support surface 230 is cooperatively designed with a vacuum ring 232 coupled to a vacuum conduit 234 and a vacuum coupling 236.

Other embodiments include three or more disk support surfaces, each surface cooperatively designed with a separate vacuum ring coupled to a vacuum conduit and a vacuum coupling for holding a separate disk of a selected ID. Each type of vacuum holder 194 is attached, for example, by two screws and driven by the drive and gear assembly, as shown in FIG. 4. This enables a precise angular positioning or rotation in order to measure a selected area of the magnetic disk.

Automatic magneto-optic system 10 performs the above-described measurements. According to one preferred embodiment, where multi-disk assembly 140 can be located only outside of the high-field magnet, a software module controls operation of disk assembly 140 the following way. At each disk measurement location, the system software determines whether angular displacement or rotation is necessary for the selected location to be inside the magnet. If this is the case, the disk is automatically partially lifted from the cassette using the above-described vacuum saddle that matches the curvature of the disk (i.e., the saddle manufactured for the disk ID). Using a 3-axis motion system, the disk is then brought in proximity with disk holder 194. The software controls the application of vacuum by automatically selecting the ID vacuum actuator and thus the appropriate vacuum channel. The disk is then rotated by the required amount. The handoff process is then reversed, and the transfer blade holds the disk using the vacuum saddle and positions the disk at the selected location inside the high magnetic field.

According to another embodiment, disk assembly 140 or vacuum holder 194 are designed and constructed to be positioned inside the magnet. Vacuum holder 194 is made of a non-magnetic material and can be displaceable with respect to disk assembly 140 or the gear assembly. For example, vacuum holder 194 may be mounted on an extension arm, located between the gear assembly and holder 194. The extension arm displaces holder 194, including the mounted and aligned disk, into the magnet. This embodiment eliminates the above-described handoff process.

Having described various embodiments and implementations of the present invention, it should be apparent to those skilled in the relevant art that the foregoing is illustrative only and not limiting, having been presented by way of example only. The functions of any one element may be carried out in various ways in alternative embodiments. Also, the functions of several elements may, in alternative embodiments, be carried out by fewer, or a single, element.

The invention claimed is:

1. An automatic magneto-optic system, comprising:
   a magnet having a field strength greater than two Tesla, wherein the magnet is controlled by a magnet control module;
   a non-contact magneto-optic measurement module for performing magneto-optic measurements; and
   an automated cassette-based disk transfer module co-operatively constructed and arranged with a multi-disk positioning module designed to hold a disk and to position said disk having a selected location inside a magnetic field of said magnet for a magneto-optic measurement.

2. The automatic magneto-optic system of claim 1 wherein said multi-disk positioning module is further constructed to hold said disk having two sizes.

3. The automatic magneto-optic system of claim 2 wherein said multi-disk positioning module includes two motors.

4. The automatic magneto-optic system of claim 2 wherein said multi-disk positioning module is constructed for positioning inside the magnetic field of said magnet.

5. The automatic magneto-optic system of claim 2 wherein said multi-disk positioning module is constructed for positioning partially inside the magnetic field of said magnet.

6. The automatic magneto-optic system of claim 5 wherein said multi-disk positioning module includes a vacuum holder made of a non-magnetic material.

7. The automatic magneto-optic system of claim 2 wherein said multi-disk positioning module is constructed to determine angular displacement or rotation necessary for a second selected location to be inside the magnet to perform said magneto-optic measurement and is constructed to attain said second selected position.

8. The automatic magneto-optic system of claim 2 wherein said disk transfer module includes transfer blades with vacuum saddles constructed to accommodate disks of two sizes.

9. The automatic magneto-optic system of claim 1 wherein said multi-disk positioning module is constructed for positioning outside the magnetic field of said magnet and further including a transfer blade constructed to position said disk having said selected location inside the magnetic field of said magnet for said magneto-optic measurement.

10. The automatic magneto-optic system of claim 9 wherein said transfer blade includes a vacuum saddle constructed to receive and hold said disk.

11. The automatic magneto-optic system of claim 2 wherein said multi-disk positioning module is constructed for positioning outside the magnetic field of said magnet and further includes a transfer blade constructed to position said disk having said selected location inside the magnetic field of said magnet for said magneto-optic measurement.

12. The automatic magneto-optic system of claim 2 wherein said multi-disk positioning module includes a vacuum holder constructed to receive and hold said disk having two sizes.

13. The automatic magneto-optic system of claim 12 wherein said vacuum holder is constructed to angularly displace or rotate said disks of two sizes.

14. The automatic magneto-optic system of claim 12 wherein said vacuum holder includes two vacuum rings for holding said disk.

15. The automatic magneto-optic system of claim 12 wherein said vacuum holder includes two vacuum rings for holding said disk.

16. The automatic magneto-optic system of claim 1 including a data acquisition module.

17. The automatic magneto-optic system of claim 16 including a data processing hardware module.

18. An automatic magneto-optic measurement method comprising:
   providing an automatic magneto-optic system, comprising a high field magnet providing magnetic field above 2 Tesla controlled by a magnet control module, a non-contact magneto-optic measurement module, and an automated cassette-based disk transfer module including a multi-disk positioning module designed to hold a disk and to position said disk having a selected location inside magnetic field of said magnet;
   performing magneto-optic measurements;
   positioning by said automated cassette-based disk transfer module a disk at a selected location inside the magnetic field of said magnet; and
   performing magneto-optic measurements at said selected location.

19. The automatic magneto-optic measurement method of claim 18 including positioning said disk at a second selected location inside said magnet.

20. The automatic magneto-optic measurement method of claim 18, wherein said multi-disk positioning module is further constructed to hold said disk having two sizes, and the method including positioning, at said selected location inside said magnet, said disk having a selected size.

21. The automatic magneto-optic measurement method of claim 18 wherein said positioning and said performing magneto-optic measurements is controlled automatically by control software.

22. An automatic magneto-optic system, comprising: a high field magnet providing magnetic field above 2 Tesla controlled by a magnet control module;
   a non-contact magneto-optic measurement module for performing magneto-optic measurements; and
   means for holding and positioning a disk having a selected location inside the magnetic field of said magnet for the magneto-optic measurements.

23. The automatic magneto-optic system of claim 22 wherein means for holding and positioning a disk includes a multi-disk positioning module further constructed to hold said disk having two sizes.

* * * * *